March 3, 1970     N. F. LEMMON     3,498,637

POWER-OPERATED SWINGING DRAWBAR

Filed March 11, 1968     2 Sheets-Sheet 1

*INVENTOR.*
N. F. LEMMON

INVENTOR.
N. F. LEMMON

# United States Patent Office 3,498,637
Patented Mar. 3, 1970

3,498,637
POWER-OPERATED SWINGING DRAWBAR
Norman Frederick Lemmon, Cedar Falls, Iowa, assignor to Deere & Company, Moline, Ill., a corporation of Delaware
Filed Mar. 11, 1968, Ser. No. 712,058
Int. Cl. B60d 1/14, 1/00
U.S. Cl. 280—468
4 Claims

ABSTRACT OF THE DISCLOSURE

A power-operated swinging drawbar of the type pivotally connected to a tractor for the purpose of pulling draft vehicles. A hydraulic actuator is used as the power source, and has its rod end pivotally connected to an arm of the drawbar supporting structure and its cylinder body pivotally connected to the drawbar. The connection of the cylinder body of the actuator to the drawbar is made at approximately the midpoint of the length of the cylinder body, so that the length of the actuator and the length of the actuator stroke is not limited by the distance between the drawbar and the tractor wheel.

Background of the invention

The present invention relates to improvements in power-actuated drawbars of the type pivotally mounted to a tractor for the purpose of pulling a draft vehicle.

The uses and advantages of power-operated drawbars are many. At the present time, if an operator wishes to change the position of his conventional drawbar, he is forced to dismount from his tractor, remove the locking pins on each side of the drawbar, push or kick the bar to its desired position, replace the pins, and return to the operator's station. The power drawbar can condense the above operations into a single manipulation of the actuator controls.

Power drawbars can also assist with steering control for tractors operating with high loads on severe hillsides. Appropriate positioning of the drawbar on a line between the center of draft on the implement and the center of pull of the tractor can eliminate control problems. If the operator wishes to turn uphill, a shift of the drawbar uphill causes the draft of the implement to assist in the turn. Contour farming is thus simplified.

Additional uses are that the power drawbar makes convenient the change in lateral relationship between the tractor and the implement when changing from operation in the field to transport; makes hooking up easier; and helps the tractor to "walk" through a traction stall by appropriate shifting of the drawbar from side to side.

Previous designs have been conceived for powered drawbars because of the obvious advantages. One such design incorporated a transversely-positioned actuator on each side of the drawbar. The actuators were located near the rear support of the drawbar, and used the rod ends to push the drawbar toward the central position. Such a design was limited by space considerations to the point that the drawbar could be *returned* to its central position, but could not be moved *from* it if circumstances warranted such action.

Another design incorporated an actuator positioned longitudinally along one of the side frames of the drawbar support. Movement of the actuator was transmitted through a triangular plate pivotally connected at one point to a rear corner of the drawbar supporting structure; at a second point, by means of a rigid link, to the actuator rod; and at the third, through another rigid link, to the drawbar. Such a connection allowed movement of the rod end of the actuator, as transferred through its connecting rigid link, to pivot the triangular plate. The second rigid link, between the plate and the drawbar, forced the drawbar from side to side in accordance with the pivot direction of the plate. The movement of the drawbar was not restricted as in the previously mentioned design, but the embodiment was cumbersome, concentrated stresses unnecessarily, and detracted from the general appearance of the back end of the tractor.

Summary of the invention

It is the object of the present invention to provide a drawbar which is positively controlled by a hydraulic actuator in such a way that an operator can swing the drawbar from side to side through manipulation of the hydraulic actuator controls.

Another object of the invention is to provide a power-operated swinging drawbar which can effectively traverse the entire sweep distance required of the drawbar, with the use of only one hydraulic actuator.

Still another object of the invention is to connect the hydraulic actuator to the drawbar in such a way that the distance between the wheel of the tractor and the drawbar does not limit the length of the actuator.

Still another object of the invention is to allow for the connection to the drawbar of an actuator of such size that the length of the actuator stroke will not be the maximum distance that the drawbar can be moved.

The above objects are accomplished by providing a hydraulic actuator which will control the swinging movement of a side shiftable drawbar. The actuator has its rod end pivotally mounted on an arm extending from one end of the drawbar supporting structure, and its cylinder body member supported by and pivotally connected to the drawbar by a removable bracket apparatus at a point located between the ends of the cylinder body along its longitudinal axis.

A full understanding of the details of construction of the present invention can be gained upon reading the following detailed description in conjunction with the accompanying drawings.

Description of the preferred embodiment

Figure 1:
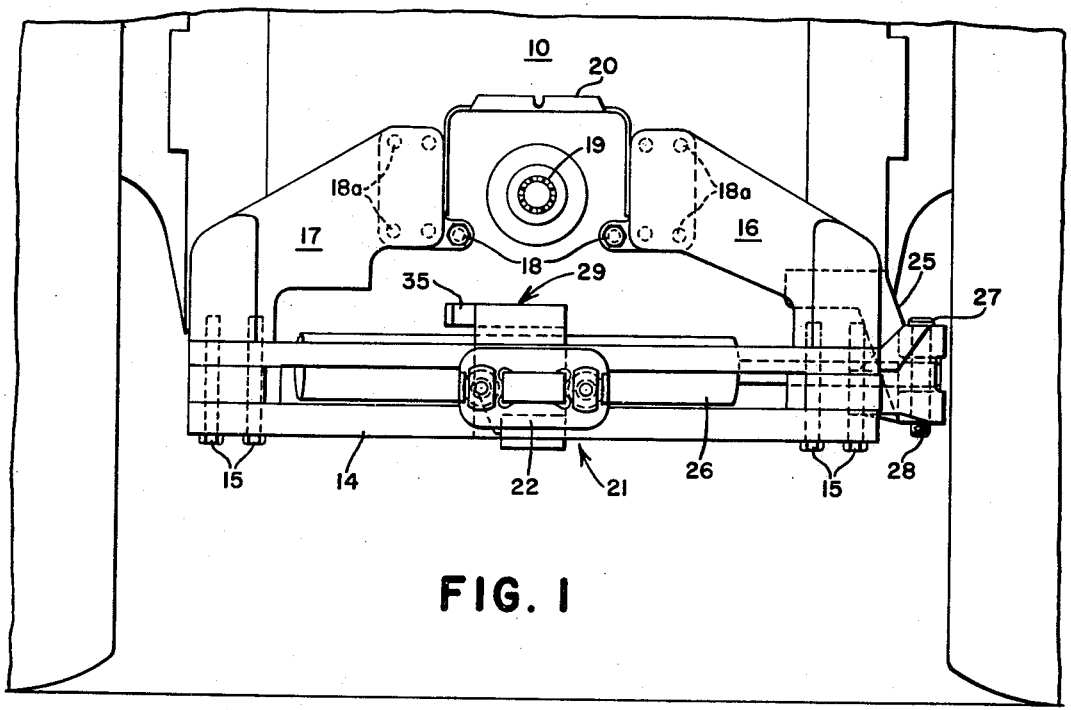
FIG. 1 is a rear elevation view of a tractor embodying the instant invention and the arrangement thereof.

The invention is disclosed as being embodied in a tractor 10 with a tractor 10 with a rearwardly extending drawbar 11 being pivotally attached to the front drawbar support 12 by pivot pin 13. The drawbar 11 is supported at the rear by a two-tiered arcuate member 14 which is positioned transversely to the tractor 10. The drawbar 11 is positioned between the tiers of member 14, which serve as a guide for the lateral movement of the drawbar 11. The arcuate member 14 is fastened at each end, by cap screws 15, to a rear support bracket. These brackets, with numerals 16 and 17 designating right and left sides respectively (in FIG. 1), are fastened to the tractor frame by cap screws 18, and are positively located in the frame by pins 18A. The brackets 16 and 17 are secured to the tractor frame adjacent the sides of the protective shield 20 for the conventional PTO 19.

The movement of the drawbar 11 through the tiers of arcuate member 14 is facilitated by a roller assembly designated in its entirety by numeral 21. The roller assembly consists of two slotted plates 22 which abut member 14 and through which the drawbar 11 is guided; of two rollers 23 which fit between the tiers of member 14 and which join the slotted plates 22 on either side of the drawbar 11; and of two pins 24 which join the rollers 23 and plates 22 together.

Attached to one end of arcuate member 14 at the point of juncture with bracket 16 is an additional supporting arm 25. The arm 25 extends outwardly and forwardly and is fastened to the frame of the tractor 10 at a point forward from and slightly above the common junction of member 14, bracket 16, and arm 25.

Arm 25 supports the rod end of hydraulic ram 26. A headed pivot pin 27 is slipped through the top part of arm 25, through the end of the rod of ram 26, and through the bottom part of arm 25. A cotter pin 28 holds the pivot pin 27 in place.

Figures 4, 5:
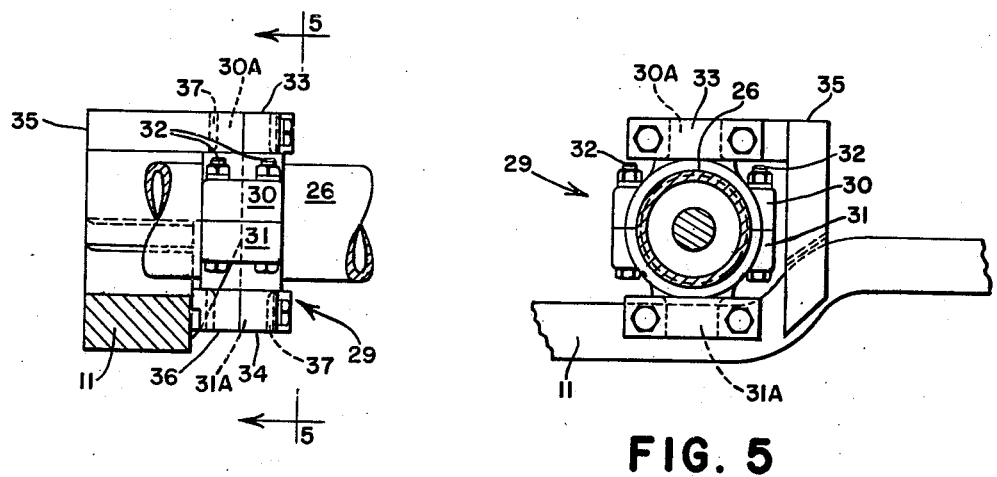
FIG. 4 is a view of the cylinder mounting and pivot assembly.
FIG. 5 is a view, partly in section, taken substantially along the lines 5—5 of FIG. 4.

The cylinder body of ram 26 is supported by and connected to drawbar 11 by means of a split clamp which is denoted in its entirety by numeral 29. Clamp 29, which is best pictured in FIGS. 4 and 5, consists of two identical halves 30 and 21 which are joined together by bolts 32. To insure that the clamp 29 will not slide along the ram 26, the cylinder body is provided with a shallow groove and the clamp 29 is positioned within the groove as is illustrated in FIG. 5. Each half of the clamp 29 contains a cylindrical recess so that when the halves 30 and 31 are bolted together, they enclose the ram 26. In addition, the clamp 29 contains two cylindrical head sections 30A and 31A at the top and bottom respectively. The top half of clamp 29 is connected to the drawbar 11 by a bearing cap 33, which is bolted to a member 35 welded onto the drawbar. Both the member 35 and the cap 33 have semi-cylindrical recesses which, when used together, enclose the cylindrical head 30A of the clamp. A thin bushing 37 which fits between the cylindrical head 30A of the clamp 29 and the block and cap combination, enables the clamp 29, and thus the ram 26, to rotate about a vertical axis through the center of the clamp 29. A similar connection is made for the bottom cylindrical head 31A of the clamp 29, with cap 34 and block 36 forming a shell around a bushing 37 and the clamp head 31A.

Figure 2:
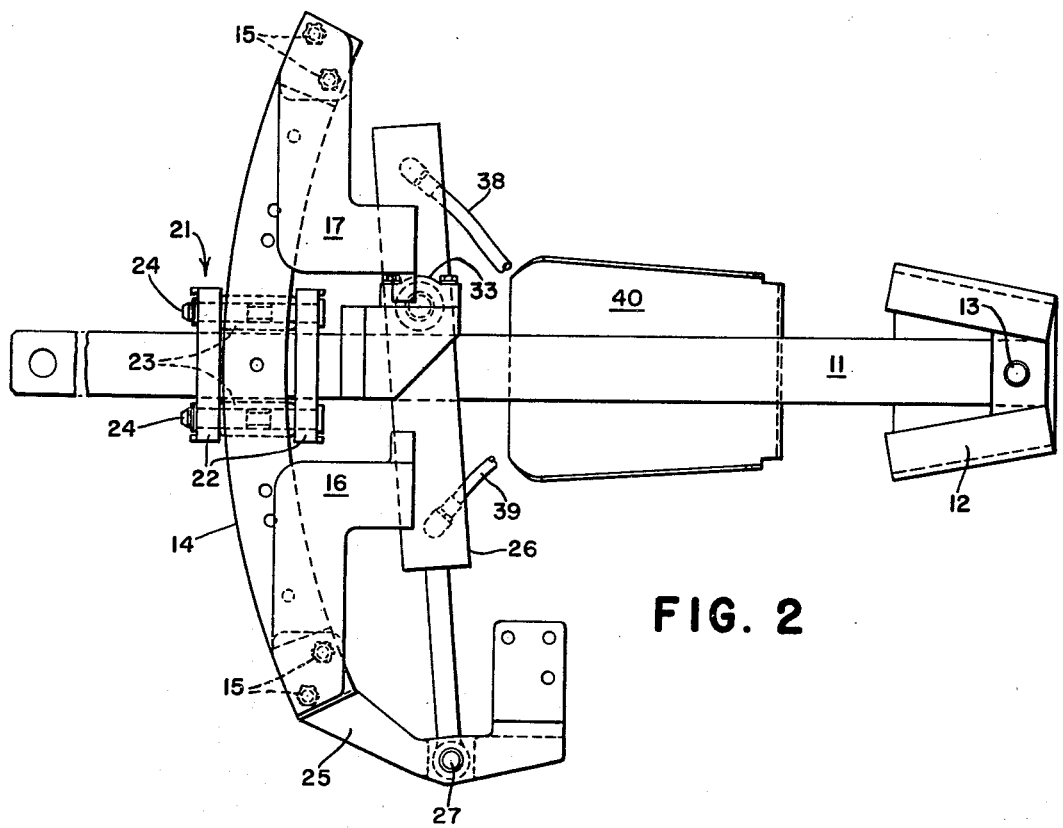
FIG. 2 is a top plan view of the drawbar and drawbar support assembly embodying the instant invention and the arrangement thereof.
Figure 3:
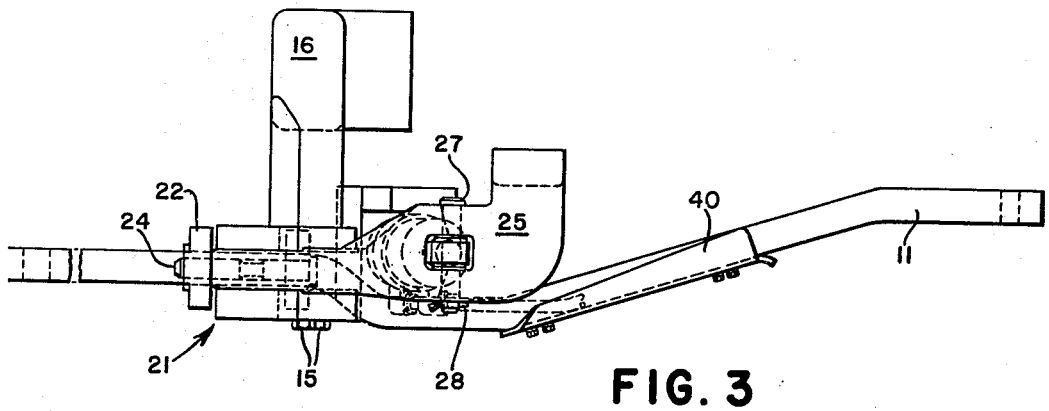
FIG. 3 is a side elevation of the drawbar and drawbar support assembly embodying the instant invention and the arrangement thereof.

The arrangement as specified dictates movement of the drawbar 11 as the ram 26 is actuated. Thus when fluid enters the ram 26 through hose 38, the rod is extended and the drawbar 11 moves to the left in FIG. 1 (upwards in FIG. 2). When fluid enters through hose 39, the rod retracts into the cylinder and the drawbar 11 moves to the right in FIG. 1 (down in FIG. 2). Hoses 38 and 39 are protected by shield 40, which is bolted onto drawbar 11 and which serves as a support and a carrier for hoses 38 and 39, as well as protecting them from contact with the ground or machinery below.

In the event that the operator wishes to lock the drawbar 11 in a certain position for continued use, holes are provided at various locations in member 14 so that pins may be placed on either side of the rollers.

While only a single preferred embodiment of the invention has been described and illustrated, it is not intended that the invention should be so limited since various modifications well within the scope of the invention will be apparent to those skilled in the art.

I claim:

1. In a tractor, a drawbar pivotally mounted to said tractor, support means for said drawbar including a transverse member and an arm at one end of said transverse member and intermediate said tractor and transverse member; and a power ram means, the rod end of said ram means being supported by and connected to said arm, and the cylinder body member of said ram means being supported by and connected to said drawbar at a position intermediate the length of said cylinder body member along its longitudinal axis; whereby actuation of said ram means causes said drawbar to traverse the length of said transverse member.

2. A combination as described in claim 1, wherein said cylinder body member of said power ram means is pivotally connected to said drawbar.

3. A device, as described in claim 2, wherein said ram means is removably connected to said drawbar and to said arm whereby said ram means can optionally be removed an dsaid drawbar used without said ram means.

4. The combination, as described in claim 2, wherein the pivotal connection between said cylinder body member and said drawbar includes a pair of oppositely directed shafts removably secured to said cylinder body member, said shafts being journaled in a pair of spaced brackets mounted on said drawbar, with the cylinder body member positioned between said brackets.

References Cited

UNITED STATES PATENTS

| 3,534,109 | 12/1950 | De Witt | 280—499 |
| 2,853,315 | 9/1958 | Hyman | 280—468 |
| 3,398,975 | 8/1968 | Roberts | 280—468 |

LEO FRIAGLIA, Primary Examiner

U.S. Cl. X.R.

280—499